E. GUNDLACH.
Stage for Microscopes.

No. 198,607.            Patented Dec. 25, 1877.

WITNESSES.
W Grach
Joseph B. Ludlam

Ernst Gundlach
INVENTOR.

UNITED STATES PATENT OFFICE.

ERNST GUNDLACH, OF ROCHESTER, ASSIGNOR OF ONE-HALF HIS RIGHT TO JOHN J. BAUSCH, OF SAME PLACE, AND HENRY LOMB, OF BROOKLYN, NEW YORK.

IMPROVEMENT IN STAGES FOR MICROSCOPES.

Specification forming part of Letters Patent No. 198,607, dated December 25, 1877; application filed November 28, 1877.

*To all whom it may concern:*

Figure 1:
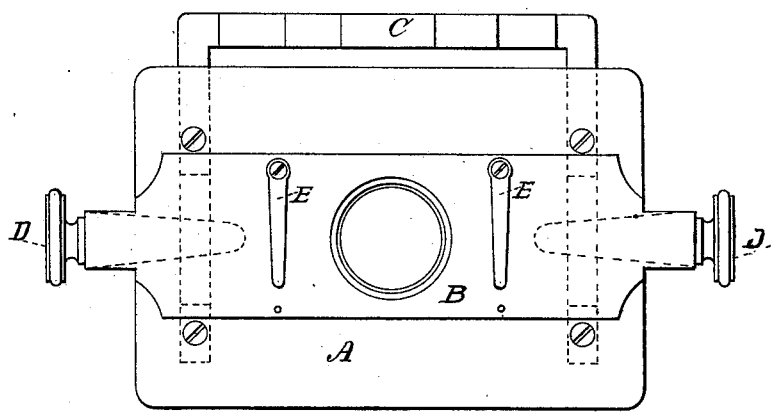
Figure 2:
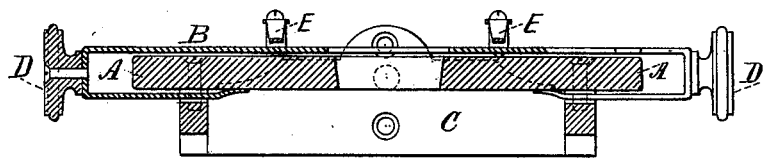
Figure 3:
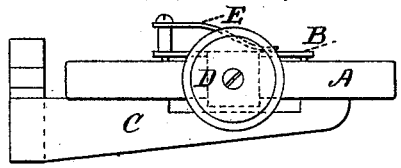

Be it known that I, ERNST GUNDLACH, of Rochester, Monroe county, New York, have invented certain new and useful Improvements relating to Stages for Microscopes, of which the following is a specification:

Figure 1 represents a plan of my improved microscope-stage. Fig. 2 is a section of the same, and Fig. 3 is a side view of it.

Similar letters of reference indicate corresponding parts.

In the course of microscopical examinations it often becomes desirable or necessary to move the object under examination from one part of the stage to another for the purpose of minutely examining each and every part of it. This may be effected by the direct action of the hand of the examiner by pushing or moving the object-slide on the stage to the desired point; or it may be done by screws or other mechanical means, as is the case with the so-called mechanical stages.

All microscopists, however, agree that the motion effected by the direct action of the operator's hand would be far preferable to the motion effected by mechanical means, for greater convenience as well as for the saving of time, if means were found to make such motion perfectly steady, smooth, and easy, so as to keep the movement completely at the will of the operator, and to prevent any sudden jerks at any stage of the movement.

In order to accomplish this result, I construct my stage of a smooth and solid glass plate, A, which is immovably fastened to the frame C, the latter being fastened to the microscope-stand in the proper place. To the smooth glass plate A, I attach a sliding plate, B, of light weight and of suitable length, bent over and under at both ends in such a way as to clasp the glass plate, the ends so bent acting as springs, and pressing the movable or sliding plate B to the glass plate A with a force just sufficient to prevent the former from slipping when the microscope is inclined at an angle.

To lessen the friction, the movable or sliding plate B is not in contact along its whole surface with the glass plate A, but rests on the top of the latter by four small knobs only, which are attached to the plate B in suitable places, while the ends, bent under and acting as springs, are in contact with the under surface of the glass plate A at their two end points only, thus reducing the friction to a minimum.

The sliding plate B, constructed as above described, should be of sufficient length to permit the necessary motion, and is provided with spring-clamps E (or other means) for holding the object-slides. It serves as a carrier to the object-slides; and the smoothness of the glass plate A and the very slight friction thereon of the knobs and spring ends of the sliding plate B (serving as object-slide carrier) permit the operator to move this slide-carrier evenly, smoothly, and without jerks, from any part of the glass plate A to any other part of it, as far as the length of the sliding plate B will admit, and thus enables him to place the object to be examined at any point deemed most suitable for such examination.

For convenience of handling, a couple of buttons, D D, are attached to the sliding plate B at the points where the ends are bent under.

The advantages of microscope-stages constructed after my above-described plan over those constructed in the various other ways now known consist in their greater simplicity of construction and consequent reduction of the cost, their easier and surer working by direct hand operation permitting any desired movement of the object to be effected with great steadiness and accuracy.

I do not claim as my invention the fixed glass stage by itself alone, nor the movable slide-carrier by itself alone, being aware that both these devices have been separately used before this; but

What I claim as new, and desire to have secured to me by Letters Patent of the United States, is—

A stage for microscopes consisting of a strong glass plate immovably fastened to the stand, in combination with a sliding plate acting as an object-slide carrier, the whole constructed and operated in the manner and for the purpose above described.

ERNST GUNDLACH.

Witnesses:
W. GRAEBE,
JOSEPH R. SUDLAM.